United States Patent [19]

Carder

[11] E : Patent Number: Re. 33,756

[45] Reissued Date of Patent: Dec. 3, 1991

[54] PILE CARPET TRIMMER

[76] Inventor: William E. Carder, 26 Sandle St., Fairport, N.Y. 14450

[21] Appl. No.: 563,319

[22] Filed: Jul. 27, 1990

Related U.S. Patent Documents

Reissue of:

[64] Patent No.: 4,825,547
Issued: May 2, 1989
Appl. No.: 33,468
Filed: Apr. 2, 1987

[51] Int. Cl.[5] ..... B26B 19/02

[52] U.S. Cl. ..... 30/216; 30/223; 26/13

[58] Field of Search ..... 30/216, 223, 228, 208, 30/210; 26/13; 173/73, 78, 80, 104

[56] References Cited

U.S. PATENT DOCUMENTS 3,992,778 11/1976 Urbush ..... 30/216
4,221,050 9/1980 Walter et al. ..... 30/216

*Primary Examiner*—Timothy V. Eley
*Assistant Examiner*—Willmon Fridie, Jr.
*Attorney, Agent, or Firm*—Shlesinger, Fitzsimmons, Shlesinger

[57] ABSTRACT

A pneumatically operated pile carpet trimmer includes a housing having a drive shaft projecting from one end thereof, and a shearing head removably threaded on the last-named end to surround the projecting end of the shaft. An operating lever which is pivotally mounted in the head is connected at one end to the movable shearing member of a set of shears which is removably mounted on the bottom of the head, and the opposite end of the lever is releasably connected to an eccentric carried by the drive shaft. When the latter rotates it oscillates the lever, which therefore reciprocates the movable shearing member. The head may have two sets of shears removably mounted thereon to operate in intersecting planes. In each case exhaust air from the housing is directed onto the shears to blow away cuttings.

19 Claims, 2 Drawing Sheets

PILE CARPET TRIMMER

Matter enclosed in heavy brackets [ ] appears in the original patent but forms no part of this reissue specification; matter printed in italics indicates the additions made by reissue.

BACKGROUND OF THE INVENTION

In recent years it has become fashionable to employ pile carpets or carpeting not only as floor coverings, but also as wall coverings, for example in place of wallpaper and the like. Whether used as floor or wall coverings, it has long been customary to create various designs in pile carpeting during its manufacture. For example, during the weaving of pile carpets so-called wavy wires, or pile cutting wires, may be inserted parallel to the weft during alternate shedding of the warp yarns in order to raise on the surface of the finished carpet high and low pile yarns in certain areas, and if desired, cut pile yarns in other areas. Similar such wavy pile surfaces can also be created in carpets produced by the conventional tufting process during carpet manufacture.

One of the disadvantages of prior such pile carpets is that the shaping of the pile surface is performed during the manufacture of the carpet, so that the purchaser is required to select whatever designs happen to be available. More recently, however, cutters or shearing devices have been developed which can be utilized after a carpet has been manufactured, to cut selected pile yarns in order to form any desired design in the pile surface of a carpet. Cutters of the type described utilize electrically or pneumatically operated clippers, or vibrating cutters similar to the type of cutters utilized for trimming men's hair, or the like.

A primary disadvantage of known such pile cutters is that cut pile yarns have tended to collect or accumulate on or near the shears or cutting edges of the device, thereby required frequent cleaning of the cutter in order to prevent undesirable jamming or improper operation of its shears.

Still another disadvantage of prior such cutters, or rug carvers as they are also known, is that their cutting blades are mounted so that the moving set of blades is reciprocated relative to the stationary set along a straight line, so that in order to cut piles of differing heights, it is necessary carefully to manipulate the cutter to tilt or otherwise adjust the linear path along which shearing occurs.

A further disadvantage of prior such cutters is that they have been designed to accomodate only one type of shearing mechanism or cutting head, so that if it is desired to change the type of cut which is made in the pile, a separate cutting device must be utilized.

It is object of this invention, therefore, to provide an improved pile carpet carver or trimmer which has a removable trimming head, and which is designed for use selectively with heads having differently shaped shears, thereby selectively to change the contour of the cutting plane along which the shears cut.

Another specific object of the invention is to provide an improved, penumatically operated carpet trimming device which is designed to utilize exhaust air from the device for blowing severed pile yarns away from the shears.

It is a further object of this invention to provide for pneumatically operated cutting devices of the type described improved, differently shaped shearing heads, which can be removably mounted on the devices.

Still another object of the invention is to provide an improved carpet cutting or carving device of the type described which is substantially simpler and less expensive to manufacture than prior such cutters.

Other objects of the invention will be apparent hereinafter from the specification and from the recital of the appended claims, particularly when read in conjunction with accompanying drawings.

SUMMARY OF THE INVENTION

A housing is connected at one end to a supply of compressed air and has a shearing or cutting head removably threaded onto its opposite end. A rotatable drive shaft in the housing extends into a chamber in the cutting head and carries an eccentrically mounted wheel, which is seated in a slot in the upper end of a lever that is mounted in the chamber to pivot intermediate its ends about a stationary axis beneath and parallel to the drive shaft. The lower end of the lever projects into the upper, movable cutting blade of a set of shears, which is removably mounted on the bottom of the head. When a valve on the housing is operated to cause compressed air to rotate the drive shaft, the eccentrically mounted wheel revolves about the axis of the shaft, thus rocking or oscillating the lever so that its lower end reciprocates the movable shearing blade relative to the lower, stationary blade.

To keep the cut pile yarns from collecting on the cutting blades the air exhausted from the housing is directed through ports in the head onto the cutting blades to blow away cut pile yarns. The heads are designed to have mounted thereon differently shaped sets of cutting blades or shears, e.g., those that shear along a straight line, and those which include two sets of shears inclined at an angle to each other so that the shear line forms an acute or obtuse angle.

THE DRAWINGS

FIG. 1 is a side elevational view of a known (prior art) pneumatically operated cutter or trimmer which heretofore has been employed for trimming pile carpet and the like.

DETAILED DESCRIPTION OF THE PREFERRED EMBODIMENTS OF THE INVENTION

Figure 1:
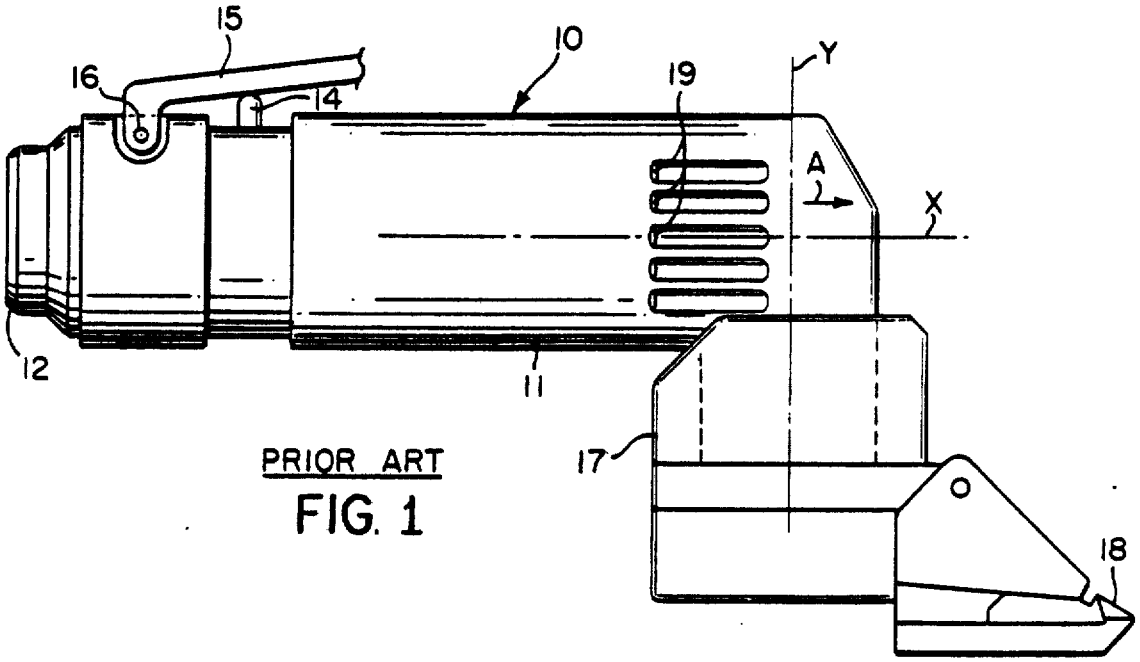
PRIOR ART FIG. 1

Referring now to the drawings by numerals of reference, and first to FIG. 1, 10 denotes generally a conventional, pneumatically operated pile carpet cutter comprising a housing 11 having an inlet end 12 adapted to be connected to a supply of compressed air, and a valve controlling stem 14 projecting out of housing and beneath the operating handle 15, which is pivoted at one end to the housing as at 16. Housing 11 contains a drive shaft (not illustrated) disposed to rotate about axis X when handle 15 is operated. This shaft is geared in housing 11 to another shaft (not illustrated) which rotates about an axis Y at right angles to the drive shaft, and which extends downwardly into a cutting head 17, which is fastened to the underside of housing 11 at its forward (right) end. This latter shaft is drivingly connected in the head 17 to a set of conventional trimming shears 18, which project from the forward end of head 17.

In operation, after the compressed air in housing 11 functions to impart rotation to the operating shaft about axis X, the air is discharged in the direction of arrow A in FIG. 1 out of a plurality of small ports or openings 19, which are formed in housing 11 adjacent its forward end, and above the head 17. As will be apparent to one skilled in the art, operation of the cutting device 10 will cause its shears 18 to cut pile yarns, or the like, along a line or plane extending normal to the plane of the drawing.

Figure 2:
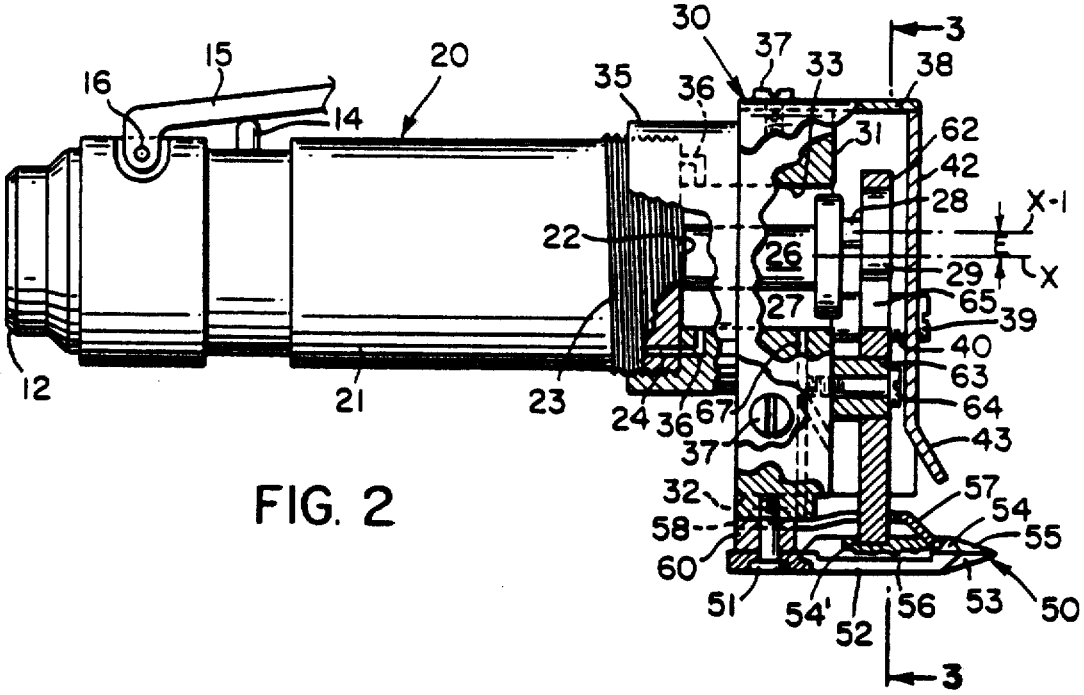
FIG. 2 is a fragmentary side elevational view of a pneumatically operated pile cutter made according to one embodiment of this invention, portions of the cutter being broken away and shown in section.
Figure 3:
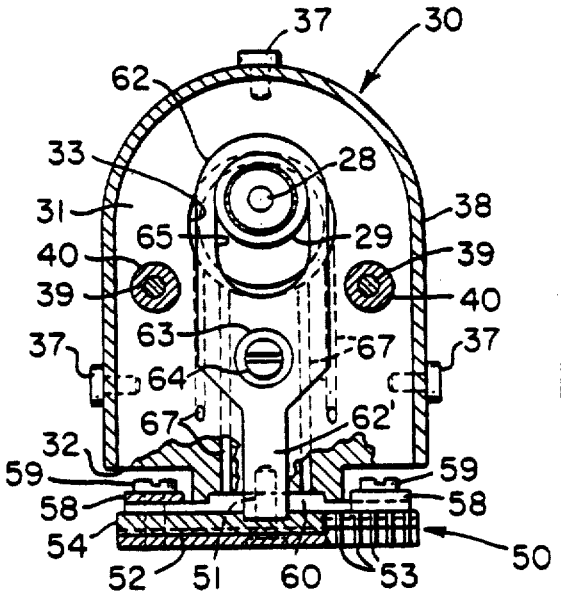
FIG. 3 is a sectional view taken generally along line 3—3 in FIG. 2 looking in the direction of the arrows.

Referring now to FIGS. 2 and 3, 20 denotes generally a novel carpet pile cutter or trimmer comprising a housing 21, which is generally similar in configuration to housing 11, and which has thereon the same type of handle 15, for controlling the flow of compressed air through the end 12 of housing 21 to its interior. Unlike housing 11, however, the forward or right end (FIG. 3) of housing 21 terminates in a plane, transverse surface 22, which extends normal to the axis Y, and is externally threaded as at 23. Also, unlike the compressed air exhaust ports 19 in housing 11, the exhaust ports 24 for the housing 21 (only one of which ports is illustrated in FIG. 2) open on the transverse end face 22 of the housing.

Projecting coaxially beyond the end face 22 of housing 21 for rotation about an axis X is a rotatable operating shaft 26, which, unlike the operating shaft in housing 11, is not drivingly connected to a vertically disposed shaft. Instead, shaft 26 has secured to its forward end (right end in FIG. 2) a coaxially disposed, enlarged-diameter circular disc or plate 27, which carries an eccentrically offset mounting pin 28 having an axis X-1 (FIG. 2) that extends parallel to, but which is radially offset the distance E from the rotational axis Y of shaft 26. Mounted on a ball bearing race, or the like, to rotate about the outer end of pin 28 coaxially thereof, and in axially spaced relation to the circular plate 27, is a shear operating roller 29, the purpose of which will be described in greater detail hereinafter.

Removably mounted on the forward, threaded end of housing 21 is a shearing or trimming head 30, comprising of a thick, metal mounting plate or block 31, which has an outer surface that is inverted, generally U-shaped in cross sectional configuration, and which has a plane, flat bottom surface 32. Adjacent its upper end block 31 has therethrough a circular bore 33 disposed coaxially of the bore in an internally threaded, annular boss or collar 35, which is integral with and which projects from the rear face of block 31 coaxially of bore 33. The collar 35 is threaded onto the threaded forward end of housing 21 in such manner that a series of right-angular ports 36 in the annular wall of the collar 35 communicate each at one end with one of the compressed air exhaust ports 24 in the housing 21, so that air discharged from the housing is free to pass through the ports 36 into the bore 33 in block 31 for a purpose noted hereinafter.

Secured by screws 37 around the outside of block 31 is an inverted, generally U-shaped, metal cowling or shield 38, which is wider than block 31 so that it extends a rather substantial distance beyond the outer, transverse face of the block. Secured by a pair of screws 39 and tubular spacers 40 over the outer end of shield 38, and in spaced, parallel, confronting relation to the outer end face of the mounting block 31, is a metal cover plate 42. The lower, marginal edge portion of cover 42 is bent as at 43 slightly outwardly and away from the upper portion of the cover for a purpose noted hereinafter.

Removably secured by a screw 51 to the underside 32 of the mounting block 31 is a set of shears, which is denoted generally by the numeral 50. In the embodiment illustrated, the shears comprise a lower, stationary cutting plate 52, which is mounted in generally spaced, parallel relation to the underside 32 of the mounting block 31, and which has formed on its cutting edge a plurality of spaced, pointed cutting teeth or blades 53. Mounted to reciprocate on the upper surface of plate 52 beneath the underside of block 31 is a cooperating cutting plate 54, which also has formed on its cutting edge a plurality of spaced, pointed cutting blades 55, which are disposed to overlie and reciprocate laterally relative to the lower cutting blades 53 to shear pile carpet yarns in a manner which will be apparent hereinafter.

As shown more clearly in FIG. 2, a boss 56, which projects from the underside of the upper cutting plate 54, is held for sliding movement in a cooperating recess in the upper surface of plate 52 by a resilient spring plate 57, the forward edge of which seats in a cooperating groove formed in the top of plate 54. Integral with and projecting rearwardly from opposite ends of the spring plate 57 are two, spaced, flexible mounting arms 58, which are secured by screws 59 (only one of which is shown in FIG. 2) to the stationary plate 52 adjacent the rear edge thereof. As shown in FIG. 2, the screws 59 also pass through opposite ends of a mounting bracket or spacer plate 60, which overlies the lower plate 52 beneath the mounting arms for the spring plate 57. The bracket 60 is secured intermediate its ends to the bottom of the mounting block 31 by the screw 51, which thereby removably secured the complete set 50 of shears to the underside of the block 31.

The upper, movable cutting or shearing plate 54 is disposed to be reciprocated by an oscillatable operating lever or yoke 62, which is mounted adjacent its lower end to pivot in the space between the mounting block 31 and the cover 42 about an annular bearing 63. Bearing 63 is secured by a screw 64 to the outer, transverse face of the mounting block 31 beneath its bore 33. Adjacent its upper end above the bearing 63 the lever 62 has therein an elongate slot 65, which surrounds the roller 29 on shaft 26. At its lower end beneath the bearing 63 the lever 62 has thereon a narrow projection 62' (FIG. 3), which extends downwardly between the rearwardly projecting arms of the spring plate 57, and into a recess 54' in the upper face of the movable cutter plate 54 rearwardly of the groove that is engaged by spring plate 57.

In operation, when the handle 15 is manipulated to open the valve 14 and to allow compressed air to enter housing 21, the shaft is rotated thus causing its eccentric pin 28, and the roller 29 to revolve about the axis X of shaft 26. As roller 29 revolves it also rotates and shifts, when necessary, in the slot 65 of lever 62, thereby causing the lever 62 to be oscillated about the axis of the bearing 63. This causes the lower end 62' of the lever to reciprocate the upper cutter plate 54 relative to the lower, stationary plate 52, and at the same time causes the cutting or shearing points 55 to be reciprocated laterally relative to the lower points 53.

During the operation of the shears, the compressed air which is exhausted through ports 24 and 36 is trapped in the bore 33 by virtue of the shield 38 and cover 42, which form a chamber adjacent the outer end of bore 33. Portions of this trapped air are forced downwardly out of the bottom of the chamber between block 31 and cover 42, most of this air being directed onto the shears by the inclined portion 43 of the cover plate 42. The remaining air entering the bore 33 is free to travel downwardly through a plurality of ports 67, which are formed in the mounting block 31, some to open on the bottom surface of the block, and others of which are inclined so as to open on the outer face of the block just above the shears. In this way, during the operation of the shears for cutting carpet pile yarns, the exhaust air is directed downwardly onto the shears to blow away cut yarns and lint which might otherwise accumulate on or around the shears to obsure the cutting path or to interfere with proper operation of the shears.

In addition to the advantage of utilizing compressed air for cleaning the shears during use, the embodiment shown in FIGS. 2 and 3 has the advantage that it eliminates the need for employing a complicated gearing mechanism and second drive shaft of the type heretofore employed for rotation about the axis Y in the prior art device shown in FIG. 1. Applicant's device uses only the single device shaft 26, together with the eccentric pin 28 for manipulating the operating lever 62 of the shears. Furthermore, applicant's apparatus has the decided advantage that the head 30 is readily removable from and mountable upon the housing 21 simply be threading the collar or boss 35 of the head onto the externally threaded portion 23 of the housing.

Figure 4:
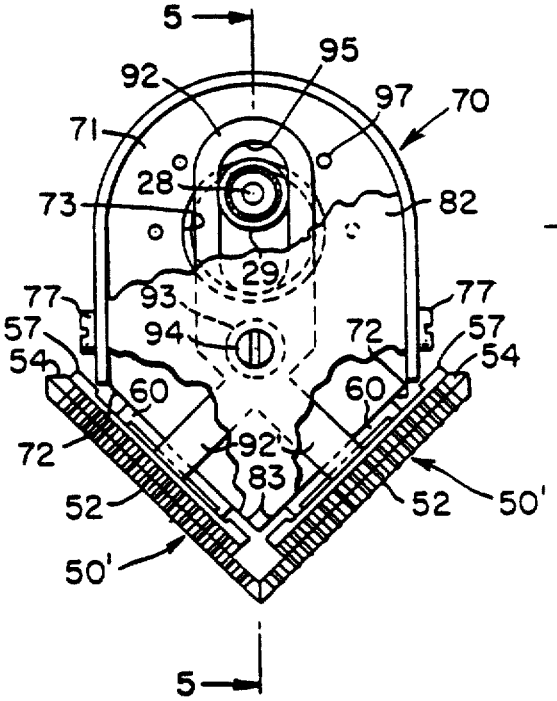
FIG. 4 is a sectional view similar to FIG. 3 but showing a modified form of this invention.
Figure 5:
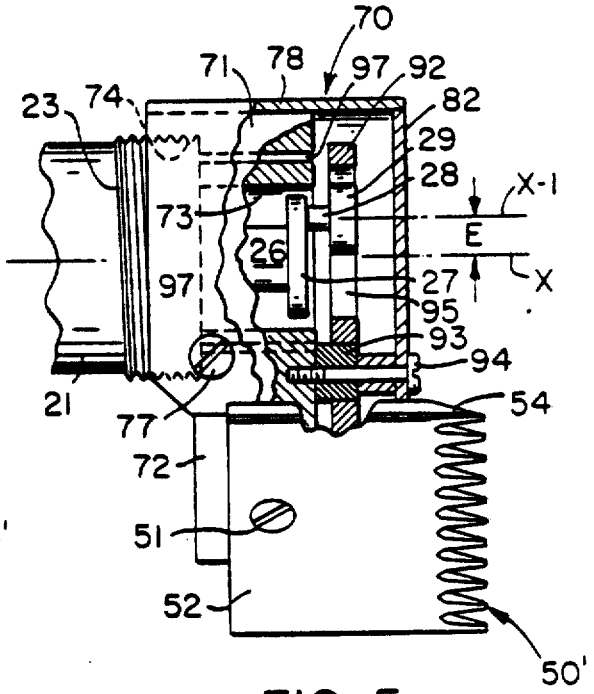
FIG. 5 is a fragmentary sectional view taken generally along the line 5—5 in FIG. 4 looking in the direction of the arrows.

Referring now to the embodiment illustrated in FIGS. 4 and 5, wherein like numerals are employed to denote elements similar to those employed in the first embodiment, 70 denotes generally a modified shearing head comprising a metal mounting block 71 which, as in the case of the first embodiment, has on its upper end an outer surface which is inverted, generally U-shaped in cross-section. However, instead of having a plane, transverse underside, such as the underside 32 of the mounting block in the first embodiment, the mounting block 71 of this modified embodiment has a compound underside or surface in the form of a pair of inclined, plane surfaces 72, which intersect each other at right angles along a plane extending through, or containing, the axis X of the operating shaft 26.

Adjacent it upper end the mounting block 71 has therethrough a circular bore 73, which registers with an internally threaded counterbore 74 that is formed in the inner or left end of the block as shown in FIG. 5. The counterbored end 74 of the block is removably threaded onto the outer, threaded end 23 of a housing 21 of the type employed in the first embodiment. Also as in the first embodiment, an inverted, generally U-shaped metal cowling or shield 78 is secured over the curved, upper end of block 71 by a plurality of screws 77, and extends at one end (the right end in FIG. 5) beyond the outer, transverse end face of the block. The outer end of the cowling 78 is closed by a cover plate 82, which has a rounded upper end similar in configuration, to the upper inside surface of the cowling 78, and which has a pointed lower end formed by a pair of inclined, nearly right angular intersecting edges 83 that register with the inclined surfaces 72 of block 71.

Secured each by a screw 51 (only one of which is shown in FIG. 5) to the inclined surfaces 72 on the bottom of block 71 or two, inclined sets of shears, each of which is generally similar in construction to the shears 50 of the first embodiment, and each of which is denoted generally by the numeral 50'. The only significant difference between shears 50 and 50', apart from how they are mounted, is that the adjacent ends of the intersecting sets 50' meet each other along a plane which contains the axis of shaft 26, and which is inclined to the planes of the two cutting plates 52 and 54 that form each set of shears 50'.

The upper, movable cutter plate 54 for each of the shears 50' is adapted to be reciprocated by an oscillatable operating lever or yoke 92, which is mounted adjacent its lower end to pivot in the space between the block 71 and the cover 82 about an annular bearing 93. Bearing 93 is secured by a screw 94 to the outer, transverse face of the mounting block 71 beneath bore 73. Adjacent its upper end above the bearing 93, lever 92 has therein an elongate slot 95 which surrounds the roller 29 on shaft 26. At its lower end beneath bearing 93, lever 92 differs from the operting lever in the first embodiment, in that it has formed thereon a pair of narrow projection 92' (FIG. 4) which project diagonally outwardly from opposite sides of the mid point of the lever, and substantially at right angles to each other. As in the case of the first embodiment, each of the projections 92' at its lower, terminal end seats in a registering recess (not illustrated in FIGS. 4 and 5) which, like the recess 54' in the first embodiment, is formed in the upper surface of each of the upper, movable cutter plates 54, which forms a part of each of the intersecting shears 50'.

In this manner, as will be apparent from the description of the first embodiment, when the shaft 26 of cutter 70 is rotated, the operating lever 92 is oscillated about the bearing 93, so that the projections 92' on the lower ends of the lever cause the upper cutters 54 of shears 50' to be shifted or reciprocated first in one and then in the opposite direction relative to the lower, stationary plates 52 of these intersecting shears.

The obvious advantage of using a modified cutting tool of the type shown in FIGS. 4 and 5, is that the intersecting shears 50' can be used to cut a generally V-shaped profile or cut through the pile yarns of a carpet, or the like. Moreover, to prevent any undesirable buildup of cut yarns or lint on the shears 50', the block 71 of this second embodiment has therethrough a plurality of axially extending ports 97, which register with the exhaust ports in the housing 21, so that the compressed air discharged from housing 21 will be free to enter the chamber in which the operating lever 92 reciprocates. From there the air is discharged downwardly out of the bottom of the chamber onto the upper surfaces of the inclined or intersecting shears 50' to blow away lint and cut pile yarns.

From the foregoing it will be apparent that by constructing each head with ports which communicate with discharge ports in the front end of the housing 21, the exhaust air can be selectively directed onto various surfaces of the cutting shears 50 and 50' to prevent undesirable lint buildup. Although pneumatically operated pile cutters have been designed with ports which open on the rear end of the housing, and which have been connected by plastic tubes with the shears to blow away lint, such prior cutters have otherwise been constructed as shown in FIG. 1 herein, with all the consequent disadvantages.

Moreover, by using one or more removable cutting heads 30, 70 of the type disclosed herein it would be possible for an operator, utilizing a single housing 21, selectively to determine the cross-sectional configuration of the cut which is to be made through the pile surface of a carpet, or the like. Furthermore, while only two different configurations of the shears have been illustrated, it will be readily apparent that the number of sets of shears mounted on the housing, and the particular configuration of the cutting path formed by the shears may be altered without departing from this invention. For example, the angle of inclination or the included angle between the sets of shears 50′ could, obviously, be altered simply by changing the angle at which the surfaces 72 on the underside of the block 71 intersect each other. Also, if desired, the various sets of shears could be arranged to cut along a curved, rather than a linear line; and the number of shears operated by the associated lever, such as lever 92, would depend upon the number of projections 92′ emanating from the lever.

Finally, although this invention has been illustrated and described in detail in connection with only certain embodiments thereof, it will be apparent that it is capable of still further modification, and that this application is intended to cover any such modifications as may be fall within the scope of one skilled in the art or the appended claims.

I claim:

1. Pneumatically operated pile cutters, comprising a housing having adjacent one end thereof a compressed air inlet disposed to be connected to a supply of compressed air, a compressed air outlet adjacent its opposite end, and a valve operable selectively to admit compressed air from said supply to the interior of said housing, a head removably mounted adjacent one end thereof on said opposite end of said housing and having therein a chamber communicating with said outlet to receive compressed air exhausted therefrom, a shaft mounted in said housing to be rotated by the compressed air admitted to said housing, and extending at one end into said chamber in said head, a set of shears mounted on said head adjacent the opposite end thereof and externally of said chamber for operation by said shaft, and including first and second shearing members movable one relative to the other to effect a shearing operation, and means connecting said one end of said shaft to said one shearing member to effect movement thereof during rotation of said shaft, said head having therein adjacent the opposite end thereof an exhaust opening confronting on said shears to direct said exhausted air from said chamber onto said shears.

2. Pneumatically operated pile cutters comprising a housing having adjacent one end thereof a compressed air inlet disposed to be connected to a supply of compressed air, a compressed air outlet adjacent its opposite end, and a valve operable selectively to admit compressed air from said supply to the interior of said housing, a head removably mounted on said opposite end of said housing and having therein a chamber communicating with said outlet to receive compressed air exhausted therefrom, a shaft mounted in said housing to be rotated by the compressed air admitted to said housing, and extending at one end into said chamber in said head, a set of shears mounted on said head externally of said chamber for operation by said shaft, and including first and second shearing members movable one relative to the other to effect a shearing operation, and means connecting said one end of said shaft to said one shearing member to effect movement thereof during rotation of said shaft, said one shearing member having thereon a plurality of spaced, coplanar shearing surfaces slidably engaged with like shearing surfaces on the other shearing member along a first plane extending parallel to the axis of said shaft.

3. Pneumatically operated pile cutters as defined in claim 2, including a second, similar set of shears mounted on said head adjacent the first-named set for operation by said shaft concurrently with said first-named set, and with the shearing surfaces of said second set disposed in a second plane extending parallel to said axis and inclined to said first plane.

4. Pneumatically operated pile cutters comprising a housing having adjacent one end thereof a compressed air inlet disposed to be connected to a supply of compressed air, a compressed air outlet adjacent its opposite end, and a valve operable selectively to admit compressed air from said supply to the interior of said housing, a head removably mounted on said opposite end of said housing and having therein a chamber communicating with said outlet to receive compressed air exhausted therefrom, a shaft mounted in said housing to be rotated by the compressed air admitted to said housing, and extending at one end into said chamber in said head, a set of shears mounted on said head externally of said chamber for operation by said shaft, and including first and second shearing members movable one relative to the other to effect a shearing operation, and means connecting said one end of said shaft to said one shearing member to effect movement thereof during rotation of said shaft, said head being removably secured onto said opposite end of said housing over said compressed air outlet and having therein first duct means connecting said compressed air outlet to said chamber, and second duct means for directing compressed air from said chamber onto said set of shears.

5. Pneumatically operated pile cutters comprising a housing having adjacent one end thereof a compressed air inlet disposed to be connected to a supply of compressed air, a compressed air outlet adjacent its opposite end, and a valve operable selectively to admit compressed air from said supply to the interior of said housing, a head removably mounted on said opposite end of said housing and having therein a chamber communicating with said outlet to receive compressed air exhausted therefrom, a shaft mounted in said housing to be rotated by the compressed air admitted to said housing, and extending at one end into said chamber in said head, a set of shears mounted on said head externally of said chamber for operation by said shaft, and including first and second shearing members movable one relative to the other to effect a shearing operation, and means connecting said one end of said shaft to said one shearing member to effect movement thereof during rotation of said shaft, said connecting means comprising an operating member pivotally mounted intermediate its ends in said head and having a projection on one end thereof connected to said one shearing member, and means connecting the opposite end of said operating member to said shaft to impart oscillatory movement to said operating member upon rotation of said shaft, said projection of said one end of said operating member being operative to reciprocate said one shearing member relative to the other shearing member when said operating member is oscillated.

6. Pneumatically operated pile cutters as defined in claim 5, including a second similar set of shears mounted on said head adjacent the first-named set, said operating member having on said one end thereof a second projection spaced from the first-named projection and operatively connected to one of the shearing members of said second set to impart reciprocation thereto upon oscillation of said operating member.

7. Pneumatically operated pile cutters as defined in claim 6, including means removably mounting said sets of shears on said head to be inclined one set relative to the other, thereby to cut pile along inclined, intersecting paths.

8. Pneumatically operated pile cutters as defined in claim 5, wherein said means connecting said opposite end of said operating member to said shaft comprises an eccentric carried by said shaft to revolve about the axis of said shaft upon rotation of said shaft, and means connecting said eccentric to said opposite end of said operating member to pivot the latter upon rotation of said shaft.

9. Pneumatically operated pile cutters as defined in claim 8, wherein said eccentric is rotatable and axially slidable in an elongate slot formed in said operating member adjacent said opposite end thereof.

10. A pile carpet cutter, comprising a housing having a rotatable drive shaft projecting at one end from one end of said housing, a cutting head removably mounted on said one end of said housing and having therein a chamber surrounding said one end of said shaft, a set of shears mounted on said head, and including a pair of cooperating shearing members one of which is fixed to said head and the other of which is reciprocable relative to said head and the fixed shearing member, an operating member mounted in said head for movement between first and second limit position, and having thereon a first projection connected to said other shearing member to impart reciprocation thereto when said operating member moves repeatedly between its first and second limit positions, and means removably connecting a second projection on said operating member to said one end of said shaft and operative to move said operating member between its first and second limit positions each time said shaft is rotated, said connecting means being operative automatically to disconnect said operating member from said shaft upon removal of said head from said housing.

11. A pile carpet cutter as defined in claim 10, including a second set of shears, similar to the first-named set, and mounted on said head adjacent said first-named set, and a second projection on said operating member connected to the movable shearing member of said second set and operative to reciprocate the last-named shearing member concurrently with the reciprocation of the reciprocable shearing member of said first-named set.

12. A pile carpet cutter as defined in claim 11, including means removably mounting each of said sets of shears on said head with the reciprocable shearing members thereof disposed to reciprocate in different, intersecting planes.

13. A pile carpet cutter as defined in claim 10, wherein said head is removably threaded on said one end of said housing, said operating member is pivotally mounted intermediate its ends in said housing for pivotal movement between said first and second limit positions, and said connecting means comprises an eccentric on said shaft removably seated in a slot in said operating member.

14. A pile carpet cutter as defined in claim 10, including means mounting said operating member in said head for pivotal movement intermediate its ends about an axis parallel to and offset from the axis of said shaft, said connecting means operatively connecting one end of said operating member to said shaft and operative to swing said one end in opposite directions about the pivotal axis of said operating member upon rotation of said shaft, and said first projection being on the opposite end of said operating member and being seated in a recess in said other shearing member for imparting reciprocation thereto.

15. A removable shearing head for use with a pile cutter of the type including a housing having a drive shaft projecting at one end from one end of said housing, said head comprising a body section having therethrough a bore, an operating lever pivotally mounted intermediate its ends at one side of said body section for oscillatory movement in a plane extending transverse to the axis of said bore, a set of shears removably mounted on said body section and including a pair of cooperating shearing members, one of which is fixed to said body section and the other of which is reciprocable relative to said body section and said one shearing member, means connecting one end of said operating lever to said other shearing member to impart reciprocation thereto when said lever is oscillated, said lever having therein adjacent its opposite end an elongate slot at least a portion of which registers with said bore in said body section, and means on opposite side of said body section for releasably connecting said body section to said one end of said pile cutter housing so that said one end of said shaft extends through said bore in said body section and into confronting relation to said slot in said opposite end of said operating lever, said body section having therethrough a plurality of ports at least certain of which open at one end on said bore and at their opposite ends on said set of shears.

16. A removable shearing head as defined in claim 15, wherein said other shearing member has thereon coplanar shearing surfaces which reciprocate in a first plane that extends parallel to the pivotal axis of said operating lever.

17. A removable shearing head as defined in claim 16, including a second set of shears removably mounted on said body section adjacent the first-named set and having a reciprocable shearing member that reciprocates in a second plane inclined to said first plane.

*18. A pneumatically operated tool, comprising*

*a housing having adjacent one end thereof a compressed air inlet disposed to be connected to a supply of compressed air, a compressed air outlet adjacent its opposite end, and a valve operable selectively to admit compressed air from said supply to the interior of said housing,*

*a head removably mounted adjacent one end thereof on said opposite end of said housing and having therein a chamber communicating with said outlet to receive compressed air exhausted therefrom,*

*a shaft mounted in said housing to be rotated by the compressed air admitted to said housing, and extending adjacent one end thereof into said head, and* means removably mounting a tool on said shaft adjacent said head and externally of said chamber for operation by said shaft upon rotation thereof,

*said head having therein adjacent the opposite end thereof an exhaust opening communicating at one end with said chamber and confronting adjacent its opposite end on said tool to direct said exhausted air from said chamber toward said tool.*

*19. A pneumatically operated tool as defined in claim 18, wherein said head has therein a plurality of spaced exhaust openings each of which communicates at one end with said chamber, and which opens at its opposite end on the exterior of said head.*

* * * * *